UNITED STATES PATENT OFFICE.

URIAL KING MAYO, OF BOSTON, MASSACHUSETTS.

COMPOSITION FOR PREPARING A HEATING AND ILLUMINATING GAS.

SPECIFICATION forming part of Letters Patent No. 288,090, dated November 6, 1883.

Application filed August 20, 1883. (No specimens.)

*To all whom it may concern:*

Be it known that I, URIAL KING MAYO, of Boston, in the county of Suffolk, of the Commonwealth of Massachusetts, have invented a new and useful Improvement in Compositions for Preparing a Heating and Illuminating Gas; and I do hereby declare the same to be described as follows:

In making my new or improved composition I take in or about in the following proportions: thirty-two pounds of petroleum benzine, one pound of rosin, one pound of gum-camphor, two pounds of blue vitriol, and one pound of beeswax.

The solid materials above mentioned are to be brought into a comminuted state, and thoroughly mixed together and incorporated with the benzine, in which they will partially dissolve. This having been done, the solution is to be placed in one or more suitable receivers, and evaporated therein with and by air forced therein, and from thence into a gasometer. The gaseous hydrocarbon thereby produced can be employed to great advantage for heating or illuminating purposes, as it readily consumes with little, if any, smoke, and produces a flame with very important light and heat giving properties.

I claim—

The composition or solution, substantially as above described, for the production of a carbureted gas or hydrocarbon vapor with and by means of air, as set forth, it consisting of benzine, rosin, camphor, blue vitriol, and beeswax, combined in or about in the proportions specified.

URIAL KING MAYO.

Witnesses:
R. H. EDDY,
E. B. PRATT.